United States Patent [19]
Lyon

[11] 3,796,070
[45] Mar. 12, 1974

[54] APPARATUS FOR REMOVING FLESH FROM ANIMAL HIDES

[75] Inventor: Lee R. Lyon, Lee's Summit, Mo.

[73] Assignee: M. Lyon & Co., Kansas City, Mo.

[22] Filed: Jan. 29, 1973

[21] Appl. No.: 327,410

[52] U.S. Cl. .................................................. 69/44
[51] Int. Cl. ........................................ C14b 17/00
[58] Field of Search ................. 69/44, 38, 47, 1, 41

[56] References Cited
UNITED STATES PATENTS

| | | | |
|---|---|---|---|
| 784,017 | 2/1905 | Turner | 69/44 |
| 791,006 | 5/1905 | Chain | 69/44 |
| 840,029 | 1/1907 | Turner | 69/44 |
| 1,239,748 | 9/1917 | Travis | 69/38 |
| 2,063,974 | 12/1936 | Ballard | 69/44 |

FOREIGN PATENTS OR APPLICATIONS

| | | | |
|---|---|---|---|
| 1,081,353 | 6/1954 | France | 69/47 |
| 1,375,679 | 9/1964 | France | 69/47 |
| 2,031,342 | 11/1970 | France | 69/44 |
| 405,557 | 2/1934 | Great Britain | 69/44 |

Primary Examiner—Alfred R. Guest
Attorney, Agent, or Firm—Fishburn, Gold & Litman

[57] ABSTRACT

An apparatus for removing flesh from animal hides during processing thereof for producing leather therefrom and comprising a pair of rotatably mounted spreading rollers spaced along and centered on a defined path through a supporting frame and a pair of rotatably mounted fleshing cylinders spaced along the defined path between said pair of spreading rollers and a pair of restraining rollers and centered on the defined path and adapted to remove flesh from an exposed side of an animal hide supported on one of a plurality of planar members moved along the defined path. Each of opposed end portions of the supporting frame has a pair of arms centered on the defined path and each with one end thereof pivotally mounted thereon and respective extensible members pivotally connected to an other end of each of the arms for selectively moving the arms which are operative to move the pair of fleshing cylinders toward and away from the defined path and the animal hide on the respective planar member moving along the defined path.

4 Claims, 10 Drawing Figures

APPARATUS FOR REMOVING FLESH FROM ANIMAL HIDES

The present invention relates to apparatus for removing flesh from animal hides and more particularly to such an apparatus having spreading rollers and cutting rollers or fleshing cylinders automatically moved toward and away from a defined path and a supported animal hide moving there along.

The principal objects of the present invention are: to provide an apparatus for removing flesh from animal hides which is automatic in spreading an animal hide and removing flesh from an exposed flesh side of the hide; to provide such a flesh removing apparatus having respective grinding bricks and supporting carriages adjacent and movable parallel with a respective one of a pair of cutting rollers or fleshing cylinders or for selectively maintaining blades thereof in a sharpened condition; to provide such a flesh removing apparatus having a plurality of planar members movably along a defined path and between a pair of spaced hide supporting members whereby an animal hide thereon is transferred to the respective planar member; to provide such a flesh removing apparatus having the spreading and cutting rollers or fleshing cylinders in an upper portion of the apparatus and thereby out of water and debris; to provide such an apparatus to remove flesh from animal hides having spreading and cutting rollers therein movable toward and away from the defined path and animal hides moving therealong in response to movement of the planar members along the defined path; and to provide such an apparatus for removing flesh from animal hides which is particularly adapted for refleshing operations and which is economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include an exemplary embodiment of the present invention and illustrate various objects and features of the apparatus for removing flesh from animal hides.

Figure 1:
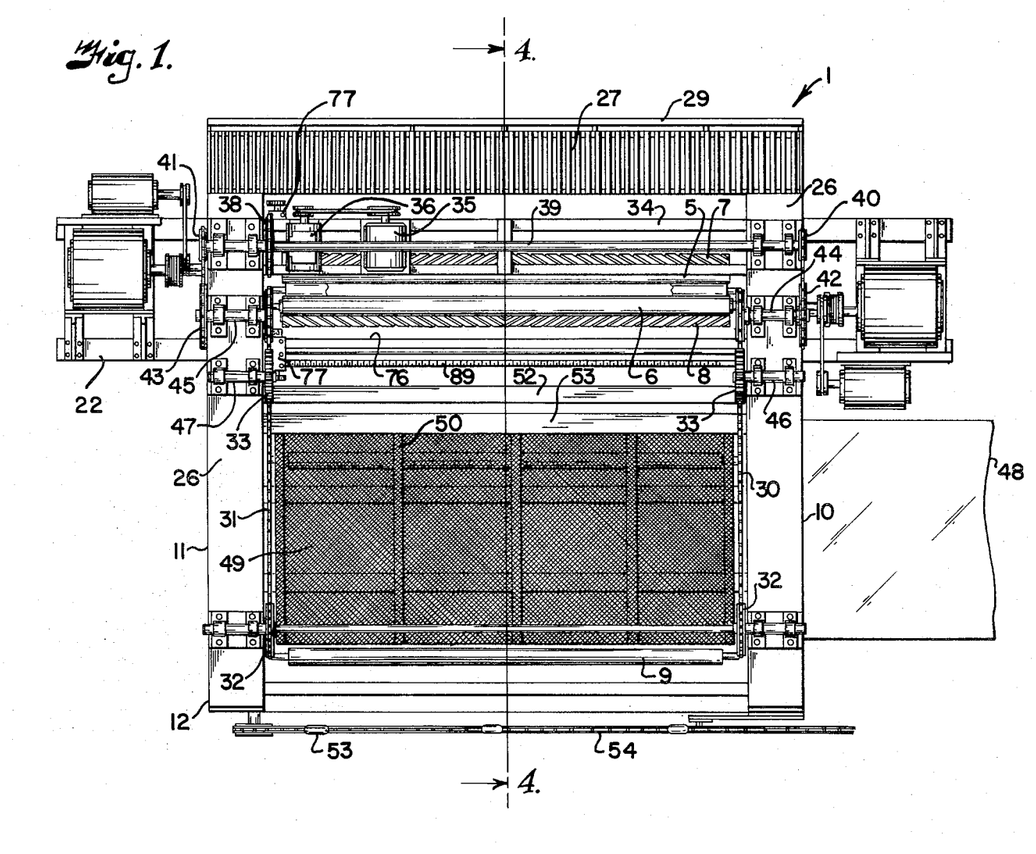
FIG. 1 is a top plan view of an apparatus for removing flesh from animal hides and embodying features of the present invention.
Figure 2:
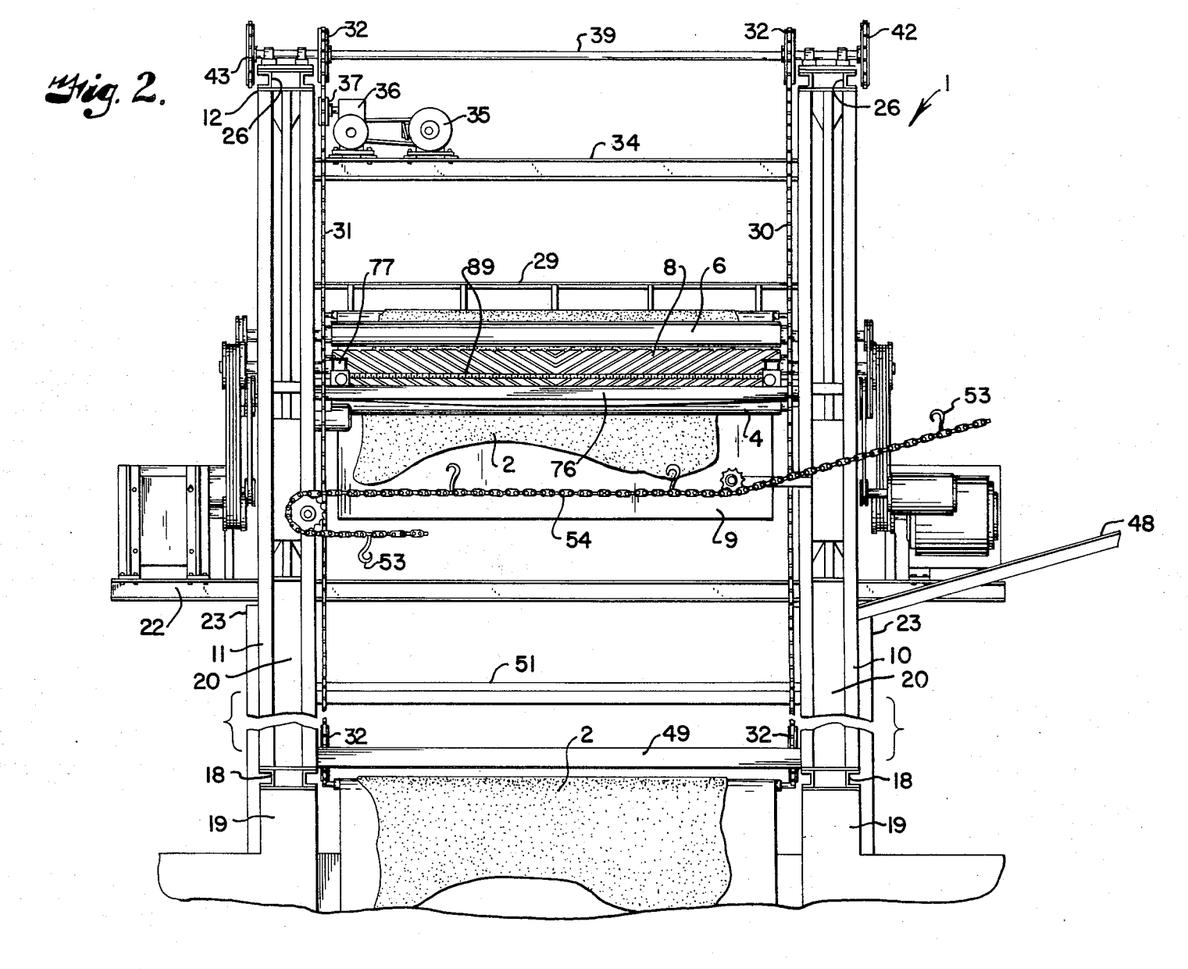
FIG. 2 is a side elevational view of the apparatus for removing flesh from animal hides.
Figure 3:
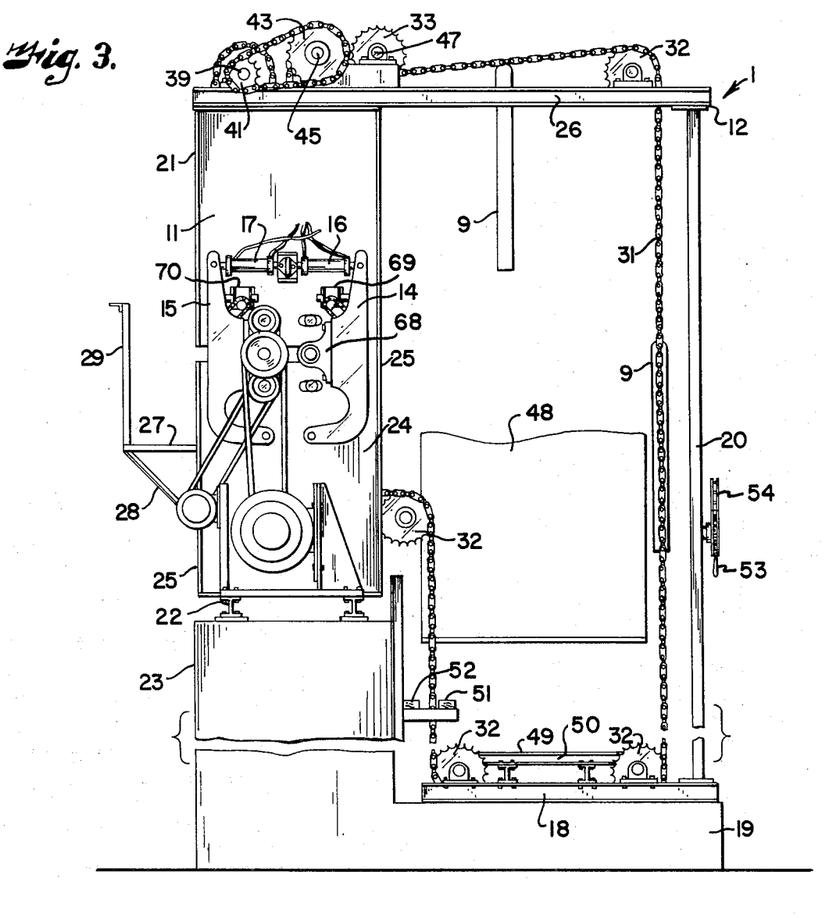
FIG. 3 is an end elevational view of the apparatus for removing flesh from animal hides.
Figure 4:
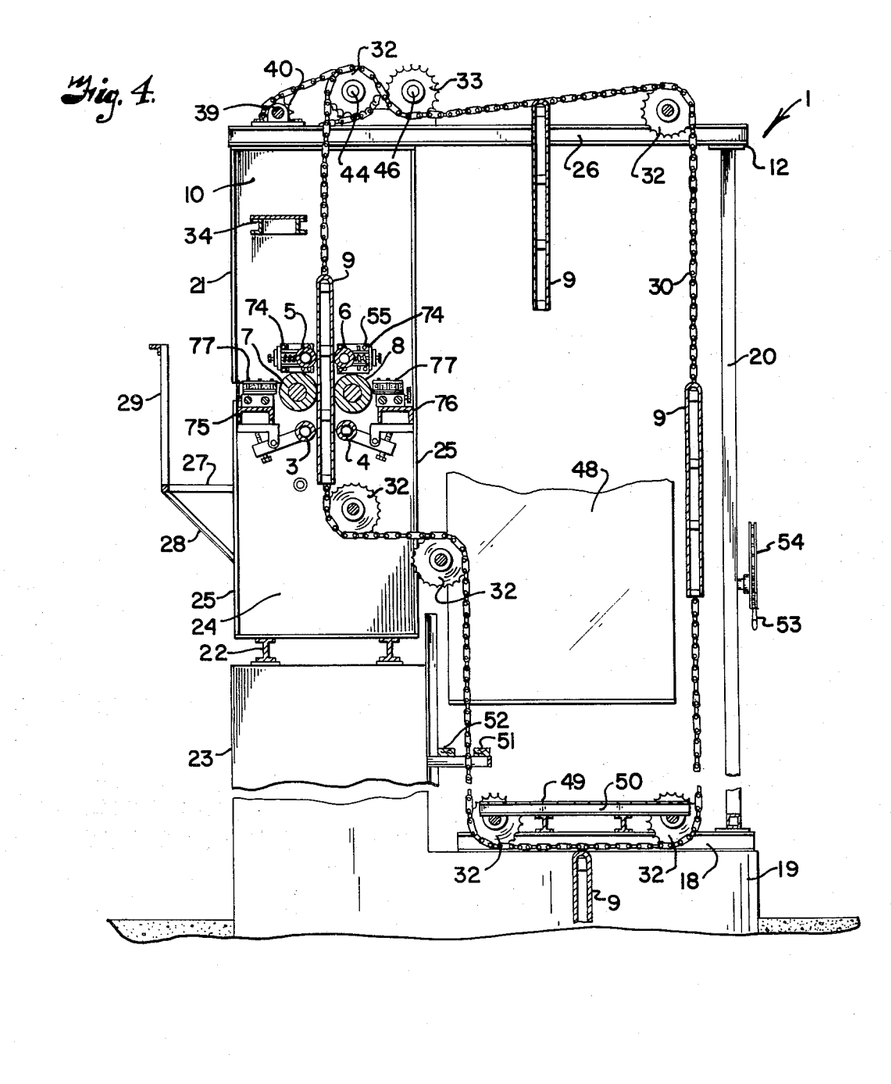
FIG. 4 is a transverse sectional view taken on line 4—4, FIG. 1.
Figure 5:
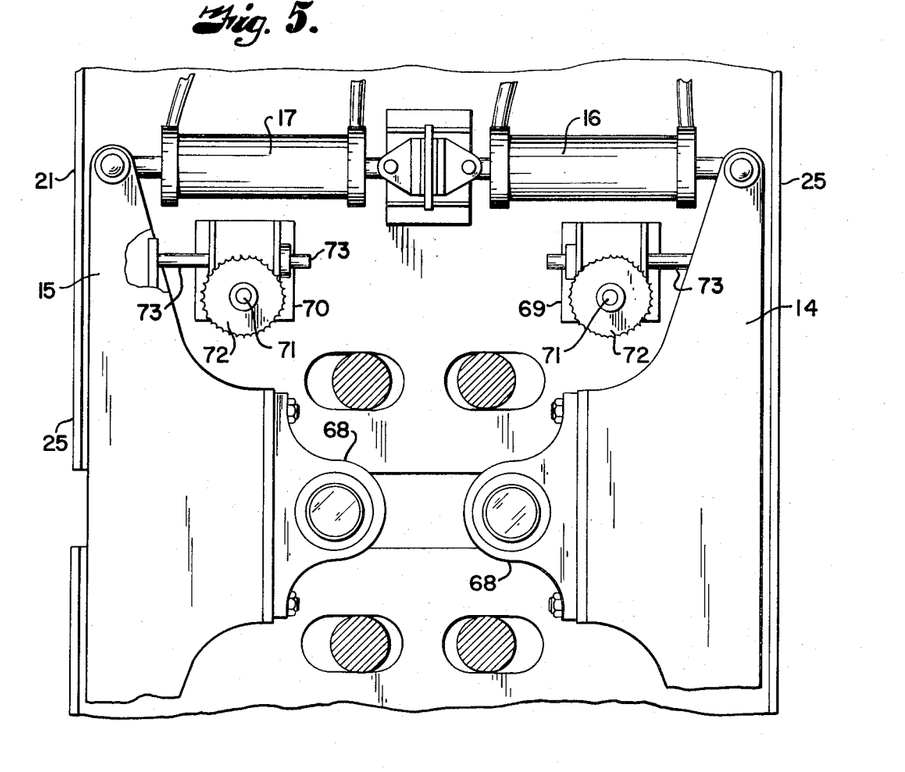
FIG. 5 is a fragmentary enlarged end elevational view of an end frame and showing adjustable supports for one end of a pair of fleshing cylinders.
Figure 6:
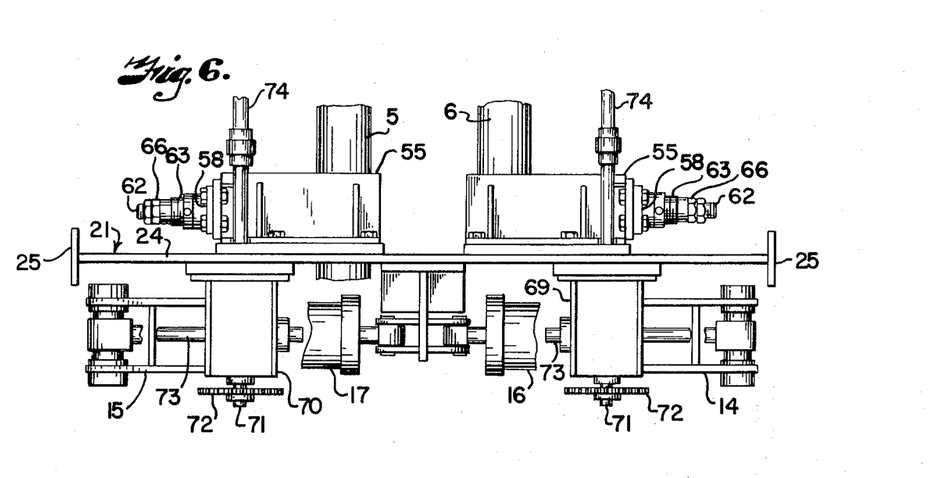
FIG. 6 is a fragmentary enlarged top plan view of the end frame and showing the support for the one end of the restraining rollers and fleshing cylinders.
Figure 7:
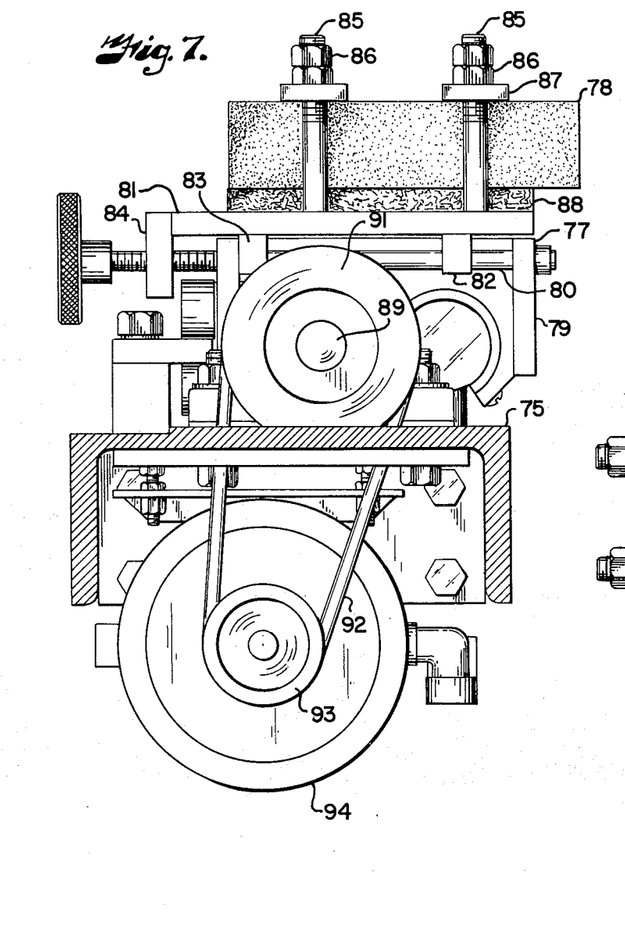
FIG. 7 is a fragmentary enlarged end elevational view showing a grinder brick and a carriage supporting same.
Figure 8:
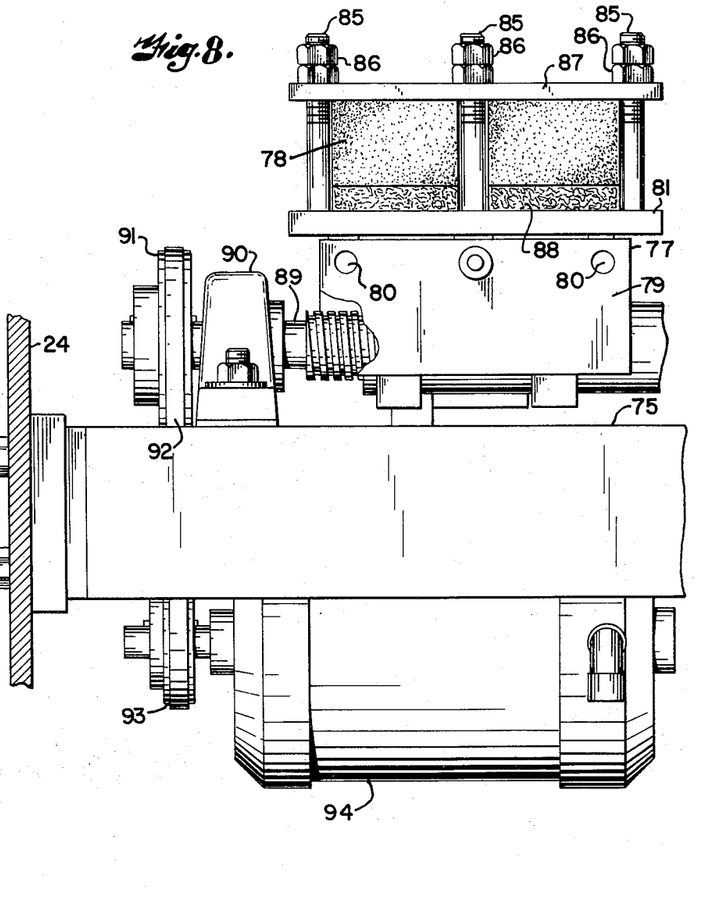
FIG. 8 is a fragmentary enlarged side elevational view of the brick and carriage and showing means for moving same along a guide rail to sharpen blades of a respective fleshing cylinder.
Figure 9:
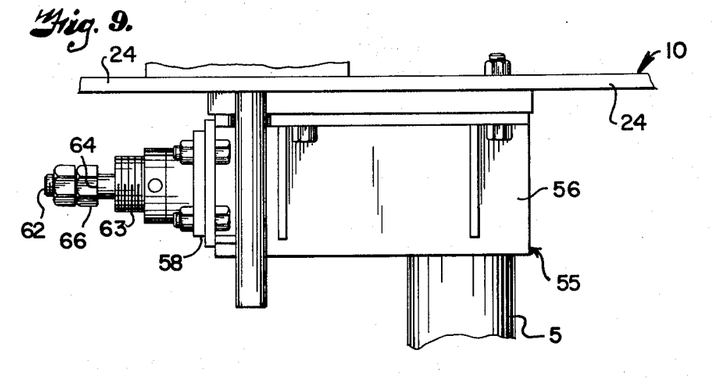
FIG. 9 is an enlarged fragmentary top plan view of the support for one end of one of the retraining rollers.
Figure 10:
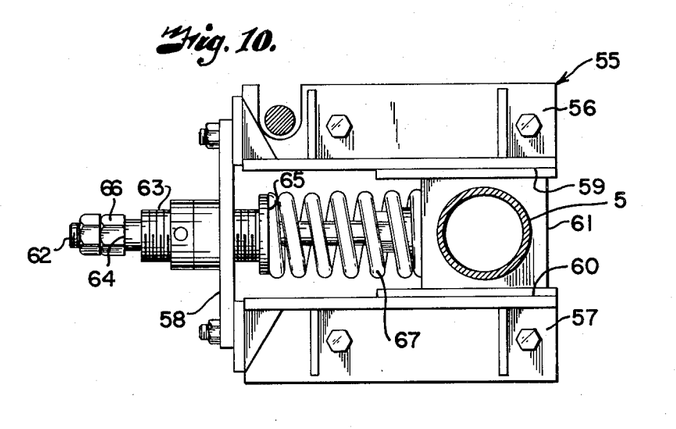
FIG. 10 is an enlarged fragmentary elevational view of the support for the one end of one of the restraining rollers.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

In the disclosed embodiment of the present invention, the reference numeral 1 generally designates an apparatus for removing flesh from animal hides 2 during processing thereof for producing leather therefrom. The flesh removing apparatus 1 includes a first pair of rotatably mounted spreading rollers 3 and 4 and a second pair of rotatably mounted restraining rollers 5 and 6 spaced along a defined path and with the rollers of each pair being centered on the defined path and a pair of rotatably mounted cutters or fleshing cylinders 7 and 8 spaced along the defined path between the spreading rollers 3 and 4 and the restraining rollers 5 and 6 and with the fleshing cylinders 7 and 8 being centered on the defined path and adapted to remove flesh from an exposed side of an animal hide 2 supported on one of a plurality of planar members 9 moved along the defined path. Each of opposed end portions 10 and 11 of a supporting frame 12 has a pair of arms 14 and 15 centered on the defined path and each of the arms 14 and 15 has one end thereof pivotally mounted on a respective one of the end portions 10 and 11 and extensible members 16 and 17 are pivotally connected to an other end of the arms 14 and 15 respectively for selectively moving the arms 14 and 15 which are operative to move the pair of fleshing cylinders 7 and 8 toward and away from the defined path and the animal hide 2 on the respective planar member 9 moving along the defined path.

The supporting frame 12 may be any suitable structure adapted to support the spreading rollers 3 and 4 and the restraining rollers 5 and 6 and the fleshing cylinders or cutters 7 and 8 while providing support for the planar members 9 during movement thereof along the defined path. In the illustrated structure, suitable base members 18 are mounted on pedestals 19 at respective opposite ends of the supporting frame 12. Suitable uprights 20 extend upwardly from the base members 18 and spaced end panels 21 are coplanar with the respective uprights 20 and are supported on beams 22 mounted on pedestals 23. The end panels 21 are illustrated as having a planar web portion 24 and opposed edge flanges 25. Top members 26 at each end of the supporting frame 12 extend between respective uprights 20 and end panels 21 to thereby provide a substantially rigid structure at each end of the supporting frame 12.

A walk-way 27 is mounted on the supporting frame 12 and positioned adjacent the spreading rollers 3 and 4 and the restraining rollers 5 and 6 and the fleshing cylinders or cutting rollers 7 and 8 to provide access thereto. The illustrated walk-way 27 has opposite ends supported on brackets 28 mounted on respective outside edge flanges 25 of the end panels 21. The walkway 27 includes a railing 29 along the outside edge thereof and extending substantially the length of the supporting frame 12.

The planar members 9 move in a defined path through the supporting frame 12 and are adapted to receive and support an animal hide 2 in a position having a flesh side thereof exposed. In the illustrated structure, the defined path has a plurality of generally horizontal portions and a plurality of generally vertical portions with a respective generally horizontal portion between adjacent generally vertical portions. Endless chains 30 and 31 are positioned adjacent respective opposite ends of the supporting frame 12 and suitable sprockets 32 are rotatably mounted on the supporting frame 12 and positioned to define the vertical and horizontal portions of the defined path. It is desirable to maintain suitable tension in the endless chains 30 and 31, therefore, a chain tightening sprocket 33 is positioned between a pair of the sprockets 32 for the run of each of the chains 30 and 31 and the chain tightening sprockets are preferably positioned and mounted to take up slack in the respective chains 30 and 31.

The planar members 9 may be formed in any suitable manner and are supported on the endless chains 30 and 31. The planar members 9 are generally rectangular members each having opposed peripheral side and end edges. The planar members 9 are mounted on the endless chains 30 and 31 in a manner to permit pivotal movement thereof relative to one of the peripheral side edges. The planar members 9 each are covered with a resilient material to accommodate variations in thickness of various portions of the animal hide 2 thereby substantially avoiding unfleshed portions or cuts in the respective hide 2.

The endless chains 30 and 31 may be driven in any suitable manner for moving the planar members 9 along the defined path through the supporting frame 12. In the illustrated embodiment, a suitable structural member 34 extends between and has respective opposite ends supported on the end panels 21 and a drive motor 35 is suitably supported on the structural member 34 and is operative to drive a gear reduction unit 36 also supported on the structural member 34 and having a sprocket 37 driven thereby. The sprocket 37 is connected to a sprocket 38 mounted on an elongated shaft 39 extending between opposite ends of the supporting frame 12 and supported on the respective top members 26, as in suitable spaced bearings. End sprockets 40 and 41 are mounted on respective opposite ends of the elongated shaft 39 and are connected by respective endless chains to sprockets 42 and 43 respectively mounted on the ends of shafts 44 and 45 rotatably mounted on respective top members 26 above respective end panels 21. The shaft 44 at one end of the supporting frame 12 is longitudinally aligned with the shaft 45 at the other end of the supporting frame 12. The shafts 44 and 45 each have one of the sprockets 32 on the other end thereof whereby rotation of the elongated shaft 39 is effective to rotate the sprockets 32 on the ends of the shafts 44 and 45 thereby driving the endless chains 30 and 31. In the illustrated structure, shafts 46 and 47 are also mounted on the top members 26 and spaced from and substantially parallel with the shafts 44 and 45 respectively and each have a respective chain tightening sprocket 33 mounted thereon and positioned adjacent the sprocket 32 on the respective shafts 44 and 45.

The animal hides 2 are delivered to the flesh removing apparatus 1 by moving down a suitable chute 48 and onto a suitable table (not shown) positioned on a platform 49 suitably supported on spaced beams 50 extending between the base members 18. The hides 2 are manually removed from the table and placed over a pair of hide support members 51 and 52, which are substantially centered on the defined path and extend transversely of a respective vertical portion of the defined path for supporting the animal hides 2 thereon and each in a position to be engaged by a respective one of the planar members 9 during movement thereof along the defined path whereby the animal hide 2 is removed from the hide support members 51 and 52 and supported on the respective planar member.

The planar member 9 having the animal hide 2 thereon moves between the pair of spreading rollers 3 and 4 which are operative to spread the animal hide, remove wrinkles therein and prepare same for movement between the fleshing cylinders or cutting rollers 7 and 8. After the leading edge of the animal hide 2 moves between the fleshing cylinders 7 and 8, the planar member 9 moves between the pair of restraining rollers 5 and 6 and then along the defined path to a position adjacent the platform 49 where a slit is manually cut in the animal hide 2 adjacent one end or edge thereof, and the slit in the hide 2 is manually placed on one of a plurality of hooks 53 on a suitable conveyor 54 adapted to move the animal hides 2 to suitable apparatus for further processing, such as hair removal or the like.

The spreading rollers 3 and 4 are preferably elongated tubular members for lightness in weight and the spreading rollers each have circumferentially spaced and longitudinally extending grooves in a respective exterior surface thereof and each adapted to receive therein a respective blade engageable with the hide 2. The spreading rollers each have opposite end portions rotatably mounted in suitable bearings (not shown) in an off center manner so that their own weight tends to cause the spreading rollers to bear against the animal hide 2. A suitable linkage is in operative engagement with respective ends of each of the spreading rollers 3 and 4 and includes suitable adjusting means, such as an adjustable nut, adapted to maintain the spreading rollers spaced apart a greater distance than the thickness of the planar members 9 whereby the spreading rollers 3 and 4 do not move close enough to the planar members 9 to actually touch same when there is no animal hide 2 on the planar members 9.

The restraining rollers 5 and 6 are positioned above the cutters or fleshing cylinders 7 and 8 and are also preferably elongated tubular members for lightness in weight and the restraining rollers 5 and 6 each have a knurled exterior surface which is adapted to bear against the respective surfaces of the planar members 9. The restraining rollers 5 and 6 cooperate to define the path of the planar members 9 and prevent an animal hide 2 being pulled over the top of a planar member 9 in the event one of the fleshing cylinders 7 and 8 should engage more of the animal hide 2 than the other fleshing cylinder. The restraining rollers 5 and 6 each have opposite end portions thereof rotatably mounted in suitable bearings (not shown) in respective brackets 55.

The brackets 55 each have upper and lower portions 56 and 57 respectively mounted on facing surfaces of each of the planar web portions 24 of the respective end panels 21. The upper and lower portions 56 and 57 are positioned in vertical spaced relation and a tie member 58 extends between and has respective opposite ends secured to the upper and lower portions 56 and 57. The upper and lower portions 56 and 57 have facing surfaces 59 and 60 respectively adapted to be engaged by a slide member 61.

Each slide member 61 has the bearing therein for rotatably mounting the respective end portion of the respective restraining roller. The illustrated slide members each have a threaded shaft 62 extending outwardly from the slide member 61 and having an externally threaded sleeve 63 mounted thereon and extending through the tie member 58. The threaded sleeve 63 is movable along the shaft 62 and has abutments 64 and 65 on respective opposite ends thereof. The threaded sleeve 63 is adjustable laterally or transversely of the tie member 58 and suitable nuts 66 are mounted on the threaded end of the shaft 62 and are moved into engagement with one of the abutments, for example abutment 64 of the threaded sleeve 63 to thereby limit the movement of the respective restraining roller toward the defined path.

The restraining rollers 5 and 6 are resiliently mounted in the brackets 55 and in the illustrated embodiment, a compression spring 67 is sleeved on the shaft 62 and has one end thereof in engagement with the other abutment 65 of the threaded sleeve 63 and the other end thereof in engagement with the slide member 61 whereby the spring is effective to urge the respective restraining roller toward the defined path and a planar member 9 and an animal hide 2 thereon moving along the defined path.

The cutters or fleshing cylinders 7 and 8 are positioned on respective opposite sides of the defined path and each have a plurality of blades thereon arranged in a pair of spirals converging at the longitudinal center of the respective cutter or fleshing cylinder. Respective opposite ends of each of the cutters or fleshing cylinders 7 and 8 are rotatably mounted on a respective one of the arms 14 and 15 at the respective end panels 21 and suitably rotatably mounted on the arms, as in pillow blocks 68.

It is desirable to limit movement of the cutters or fleshing cylinders 7 and 8 toward the defined path thereby controlling the cutting or fleshing engagement between the blades thereon and the flesh side of the animal hide 2. Therefore, gear units 69 and 70 are mounted on respective exterior surfaces of the planar web portions 24 of each of the end panels 21 and positioned adjacent upper ends of each of the arms 14 and 15 respectively. The gear units 69 and 70 each have a drive shaft 71 extending therefrom and substantially perpendicular to and extending through the respective end panel 21. The drive shaft 71 may be driven in any suitable manner, however, in the illustrated structure, a sprocket 72 is mounted thereon and is operatively connected to a suitable drive motor (not shown), as by an endless chain.

Rotation of the sprocket 72 is operative to effect movement of an abutment member or shaft 73 transverse to the defined path. The abutment shaft 73 has one end thereof adapted to be engaged by a respective one of the arms 14 and 15 adjacent the respective end panel 21 to thereby limit swinging movement of said arms toward from the defined path thereby limiting movement of the respective fleshing cylinders toward the defined path and an animal hide 2 moving therealong. A connecting shaft 74 extends between the end panels 21 and has respective opposite ends thereof connected to another end of the drive shaft 71 of the gear units 69 and 70 whereby the abutment shafts 73 at each end of the supporting frame 12 for each of the arms 14 and 15 are in substantially the same position thereby effecting uniform cutting or fleshing pressure on the animal hide 2.

It is desirable to maintain the blades on each of the fleshing cylinders 7 and 8 in a sharpened condition, therefore, rails 75 and 76 are positioned parallel with and spaced outwardly from the fleshing cylinders 7 and 8 respectively and the rails 75 and 76 have respective opposite ends thereof suitably secured to and supported on respective end panels 21, as by suitable brackets bolted thereon. Each of the rails 75 and 76 has a respective carriage 77 mounted thereon and movable therealong and with each carriage having a sharpening brick or bricks 78 thereon for engagement with the blades of the respective fleshing cylinders 7 and 8. The illustrated carriage 77 has a body portion 79 having a suitable threaded bore extending therethrough and substantially parallel with the respective adjacent rail. The body portion 79 has a plurality of rods 80 extending transverse to the defined path and providing support for a top plate 81 having the sharpening or grinding brick or bricks 78 mounted thereon. The illustrated top plate 81 has spaced depending portions 82 and 83 positioned parallel with the respective adjacent rail and with the rods 80 extending therethrough whereby the top plate 81 may be moved laterally of the body portion 79 and toward and away from the respective fleshing cylinder. The top plate 81 has a depending flange 84 adjacent one edge thereof and parallel with the depending portions 82 and 83. The depending flange 84 and the depending portions 82 and 83 are engageable with respective portions of the body portion 79 when at respective ends of movement laterally of the body portion 79.

The sharpening brick or bricks 78 may be mounted on the carriage 77 in any suitable manner. In the illustrated structure, a plurality of studs 85 are arranged in a desired pattern, such as two rows of three studs each, and extend upwardly from the top plate 81 and have upper ends thereof threaded to receive suitable fastening devices, such as nuts 86, to hold bars 87 in clamping engagement with the sharpening bricks 78 thereon. It is preferred that the sharpening bricks be supported on a yielding surface. Therefore, a suitable cushion 88 formed of cork or the like is positioned between the top plate 81 and the sharpening bricks 78.

Movement of each carriage 77 along with the respective rails 75 and 76 is effected by rotation of an elongated threaded shaft 89 extending through the threaded bore in the body portion 79. Each elongated threaded shaft 89 has respective opposite ends thereof rotatably supported in suitable bearings 90 each positioned adjacent a respective opposite end of the respective rails 75 and 76. One end of each elongated threaded shaft 89 has a suitable pulley 91 mounted thereon which is rotated by a belt 92 extending between the pulley 91 and a pulley 93 on a driven shaft of a suitable motor 94 which is preferably an electric reversible motor suitably supported on the respective rails 75 and 76.

In using a flesh removing apparatus constructed as illustrated and described, the threaded sleeve 63 in each of the brackets 55 is adjusted to a desired position conforming to the thickness of the planar member 9 and the hides 2 thereon whereby the respective restraining rollers 5 and 6 will maintain firm engagement with the respective hides 2. The drive shaft 71 of the gear units 69 and 70 are rotated either clockwise or counter-clockwise to position the respective abutment shafts 73 in a position to be engaged by the arms 14 and 15 thereby defining a desired spacing between the fleshing cylinders 7 and 8. The hides 2 are delivered to the flesh removing apparatus 1 down the chute 48 and are manually placed on the hide support members 51 and 52 whereby respective planar members 9 passing therebetween engage and support the respective animal hide 2, which is then moved upwardly between the pair of spreading rollers 3 and 4, the fleshing cylinders 7 and 8, and the pair of restraining rollers 5 and 6. When it is desired to sharpen the blades on the fleshing cylinders 7 and 8, the extensible members 16 and 17 are operated to move upper ends of the arms 14 and 15 outwardly from the defined path and thereby move the fleshing cylinders 7 and 8 into engagement with sharpening bricks 78 on the respective carriages 77. Each motor 94 is activated to rotate the respective elongated threaded shaft 89 in a first direction thereby effecting movement of the respective carriages 77 from one end of the rails 75 and 76 to the other end thereof. Each motor 94 is then reversed, thereby effecting reverse rotation of the elongated threaded shaft 89 and thereby movement of the carriages 77 toward the respective start position. The fleshing cylinders 7 and 8 are rotated during the movement of the carriages whereby the periphery of the blades on the fleshing cylinders have a uniform spacing from the respective longitudinal axis of the grinders.

It is to be understood that while I have illustrated and described one form of my invention, it is not to be limited to the specific form or arrangement of parts herein described and shown.

What I claim and desire to secure by letters Patent is:

1. An apparatus for removing flesh from animal hides comprising:
   a. a supporting frame;
   b. a two faced planar member having a leading edge, opposed end edges and opposed faces and adapted to receive an animal hide folded over said leading edge so as to lie against said opposed faces in a position having the flesh side facing outwardly;
   c. means on said frame defining a path of movement of said planar member through said frame;
   d. conveyor means operatively engaged with said planar member for moving same along said defined path;
   e. pairs of elongate arms spaced outwardly relative each of said opposed ends of the planar member with the arms of each pair positioned on opposite sides of said path, said arms each having an end portion pivotally mounted relative to the frame for swinging movement of said arms toward and away from said path of said planar member;
   f. a pair of spreading rollers on opposed sides of said path and swingably mounted for bodily movement toward said path for opposed engagement with an animal hide on a planar member passing therebetween, said spreading rollers having a plurality of circumferentially spaced longitudinally extending blades;
   g. a pair of fleshing cylinders rotatably mounted on said arms and on opposed sides of said path; said cylinders having a plurality of blades circumferentially spaced therearound said cylinders being spaced from said arm end portions and positioned to engage a hide after the spreading rollers;
   h. means operatively connected to said fleshing cylinders for rotating same;
   i. extensible means operatively connected to other end portions of said arms for moving same and the fleshing cylinders toward and away from said path and opposed engagement with an animal hide on a planar member passing therebetween;
   j. adjustable stop means engaged by said arms and limiting movement of same toward said path to adjust the spacing between the fleshing cylinders through which the hide on a planar member passes; said stop means and extensible means cooperating to hold a selected minimum fleshing cylinder spacing during flesh removal;
   k. a pair of restraining rollers movably mounted relative to said frame on opposed sides of said path and spaced from the fleshing cylinders to engage a hide on a planar member after the fleshing cylinders;
   l. means resiliently urging the restraining rollers into engagement with a hide for said restraining rollers to resist movement of a hide on a planar member during fleshing of same.

2. An apparatus for removing flesh from animal hides as set forth in claim 1 and including:
   a. rails mounted on said frame parallel to and in laterally outwardly spaced relation to respective fleshing cylinders;
   b. a carriage on each of said rails and movable thereon, said carriage having sharpening bricks thereon engageable with the fleshing cylinders to sharpen same as the carriage is moved therealong;
   c. adjustable stop means cooperating with said extensible means to move and hold said arms in position for sharpening engagement of the sharpening bricks with said fleshing cylinder.

3. Apparatus for removing flesh fron aminal hides as set forth in claim 1 and including:
   a. said two faced planar member is generally rectangular;
   b. the operative engagement of the conveyor means with said planar means is at opposed ends adjacent said leading edge thereof and permits pivotal movement of the planar member relative to said engagement;
   c. said opposed faces of said planar member are covered with a resilient material to accommodate variations in thickness of hides overlying said faces.

4. An apparatus for removing flesh from animal hides as set forth in claim 1 wherein:
   a. a rail mounted on said frame adjacent to each of said fleshing cylinders and parallel therewith, said rail being in laterally outwardly spaced relation to the respective fleshing cylinder;

b. each of said fleshing cylinders is positioned between the defined path and said respective rail; and c. each of said rails has a carriage thereon and movable therealong with the carriage having a sharpening brick thereon and engageable with the blades on the respective fleshing cylinder in response to selected movement of said respective arms for moving said fleshing cylinders into engagement with said respective bricks.

* * * * *